(12) United States Patent
Calitri

(10) Patent No.: US 11,049,204 B1
(45) Date of Patent: Jun. 29, 2021

(54) VISUAL AND TEXT PATTERN MATCHING

(71) Applicant: Bottomline Technologies (de) Inc., Portsmouth, NH (US)

(72) Inventor: Scot Calitri, Durham, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 137 days.

(21) Appl. No.: 16/213,475

(22) Filed: Dec. 7, 2018

(51) Int. Cl.
*G06Q 50/18* (2012.01)
*G06Q 30/04* (2012.01)
*G06K 9/00* (2006.01)
*G06F 40/205* (2020.01)
*G06F 40/253* (2020.01)
*G06F 40/284* (2020.01)

(52) U.S. Cl.
CPC .......... *G06Q 50/18* (2013.01); *G06F 40/205* (2020.01); *G06F 40/253* (2020.01); *G06F 40/284* (2020.01); *G06K 9/00442* (2013.01); *G06Q 30/04* (2013.01)

(58) Field of Classification Search
CPC ...... G06Q 50/18; G06Q 30/04; G06F 40/253; G06F 40/284; G06F 40/205; G06K 9/00442
See application file for complete search history.

(56) References Cited

U.S. PATENT DOCUMENTS

| | | | |
|---|---|---|---|
| 6,622,128 B1 | 9/2003 | Bedell et al. | |
| 6,882,986 B1 | 4/2005 | Heinemann et al. | |
| 6,934,691 B1 * | 8/2005 | Simpson | G06Q 20/102 382/101 |
| 7,809,615 B2 * | 10/2010 | Hui | G06Q 10/067 705/34 |
| 7,958,023 B1 | 6/2011 | Shibayama | |
| 8,744,934 B1 | 6/2014 | McCrea | |
| 9,384,264 B1 * | 7/2016 | Kavas | G06F 16/313 |
| 10,223,586 B1 * | 3/2019 | Leibovitz | G06K 9/6256 |
| 2001/0034675 A1 | 10/2001 | Belford et al. | |
| 2002/0002535 A1 | 1/2002 | Kitchen et al. | |

(Continued)

FOREIGN PATENT DOCUMENTS

CN  104809171 A  7/2015

OTHER PUBLICATIONS

"Identify a list of items using Natural Language Processing", StackOverflow, May 2017, web page found at https://stackoverflow.com/questions/44112675/identify-a-list-of-items-using-natural-language-processing on Nov. 27, 2018.

(Continued)

*Primary Examiner* — Pierre Louis Desir
*Assistant Examiner* — Nicole A K Schmieder
(74) *Attorney, Agent, or Firm* — Richard A. Baker, Jr.

(57) ABSTRACT

A method for automatically detecting block legal billing is described where the technique analyzes each billing entry in the legal bill for visual or textual aspects that indicate that a list of billing items is included in the block. The technique utilizes a combination of textual analysis for punctuation characters, count of the number of verbs, or a search for conjunctions. A visual analysis is match the image of the billing item with a predetermined image of a list. Essentially, a novel natural language processing technique is described that identifies lists in a block of text, where the block of text is in the context of a legal bill.

14 Claims, 6 Drawing Sheets

(56) References Cited

U.S. PATENT DOCUMENTS

| | | |
|---|---|---|
| 2003/0033226 A1 | 2/2003 | Anderson |
| 2003/0110103 A1 | 6/2003 | Sesek et al. |
| 2003/0195844 A1 | 10/2003 | Hogan |
| 2004/0064389 A1 | 4/2004 | Force et al. |
| 2005/0138631 A1 | 6/2005 | Bellotti et al. |
| 2007/0088641 A1 | 4/2007 | Arron et al. |
| 2007/0214068 A1 | 9/2007 | Tadepalli et al. |
| 2008/0086413 A1 | 4/2008 | Malloy et al. |
| 2008/0255972 A1 | 10/2008 | Ulrich et al. |
| 2010/0211486 A1 | 8/2010 | Abrashkin et al. |
| 2011/0010278 A1 | 1/2011 | Bulman et al. |
| 2011/0196768 A1 | 8/2011 | Ulrich et al. |
| 2012/0185401 A1 | 7/2012 | Marusyk |
| 2013/0117167 A1 | 5/2013 | Iyer et al. |
| 2014/0344126 A1* | 11/2014 | Kapoor .................. G06Q 30/06 705/34 |
| 2015/0356074 A1* | 12/2015 | Issaev .................. G06F 40/242 704/2 |
| 2015/0356246 A1* | 12/2015 | D'Souza ............ G06Q 30/0283 705/3 |
| 2016/0140529 A1 | 5/2016 | Shaaban et al. |
| 2017/0206191 A1* | 7/2017 | Biegert ................. G06F 40/169 |
| 2017/0293951 A1* | 10/2017 | Nolan ................. G06Q 10/1091 |
| 2018/0018313 A1* | 1/2018 | Bishop ................... G06N 3/006 |
| 2018/0018322 A1* | 1/2018 | Mukherjee ............ G06F 40/174 |
| 2018/0032497 A1* | 2/2018 | Mukherjee ............ G06F 40/174 |
| 2018/0114060 A1* | 4/2018 | Lozano ................. G06F 40/205 |
| 2019/0370325 A1* | 12/2019 | Dasgupta .............. G06F 40/295 |
| 2020/0151430 A1* | 5/2020 | Hassan ................... G06F 16/58 |

OTHER PUBLICATIONS

Ambrogi, Robert, Wolters Kluwer Brings Machine Learning to Legal Invoice Analysis, LawSites blog, Mar. 29, 2017, found at https://www.lawsitesblog.com/2017/03/wolters-kluwer-brings-machine-learning-legal-invoice-analysis.html on Jan. 22, 2019.

Hernandez, Gabrielle Orum, Inside Wolters Kluwer's Take on Machine Learning in E-Billing, Law.com blog, Apr. 9, 2017, found at https://www.law.com/2017/04/09/inside-wolters-kluwers-take-on-machine-learning-in-e-billing/?slreturn=20190022143039 on Jan. 22, 2019.

Legal Bill Review Reimagined, Wolters Kluwer website, found at https://www.wkelmsolutions.com/legalview-billanalyzer-savings-calculator on Jan. 22, 2019.

AI-powered IBM Outside Counsel Insights is here to help save insurance companies millions, IBM video and website found at https://mediacenter.ibm.com/media/AIpowered+IBM+Outside+Counsel+Insights+is+here+to+help+sa%20ve+insurance+companies+millions/1_56hk70vq on Feb. 10, 2019.

* cited by examiner

VISUAL AND TEXT PATTERN MATCHING

BACKGROUND

Prior Application

This application is a priority application.

Technical Field

The system, apparatuses and methods described herein generally relate to legal billing software and specifically to techniques for detecting block billing in a legal bill.

Description of the Related Art

Insurance companies, with large numbers of active litigations involved in managing claims, receive numerous legal bills each month that need to be analyzed and paid. To manage the legal billing, particularly to insurance companies, the industry has turned to online billing systems with heuristics to automatically review and analyze the legal bills. Products such as Bottomline's Legal-X or Legal eXchange help organizations control legal spend by validating invoice data to determine whether submitted rates and expenses conform to pre-determined billing guidelines.

One billing guideline that has thus far eluded automation is the use of block billing.

Almost all of law firm clients who are billed on an hourly basis are "block billed." Block billing is an accounting technique whereby lawyers aggregate multiple smaller tasks into a single "block" entry, for which a single time value is assigned. In theory, the total time charged equals the sum of the duration of each discrete task. For example, after spending ten minutes on a phone call, twenty-five minutes revising a junior associate's draft response and three minutes dashing off a brief e-mail to the client, the attorney should bill the client for seven-tenths of an hour. Often, the final block-billed entry for these tasks will end up looking something like this "Phone call with defendant's counsel; e-mail to client; revise draft response to motion to dismiss.—1.0 hours In this example, the client has been billed for a full hour, rather than seven tenths of an hour, which is the actual amount of time spent on the client's behalf, so the client is essentially paying the lawyer a gratuity of three-tenths of an hour. Furthermore, some tasks in the block billed area may be at different rates (for instance a call to the court could be at one rate and drafting a brief at another), but the block billing bills everything at the higher rate. In another instance, certain tasks may only be billed by certain employees, but the block billing masks that the higher rate employee is performing tasks that they are contractually prohibited from performing.

This sort of billable hour inflation is not necessarily the result of deliberate fraud, as lawyers are notoriously poor at keeping accurate and contemporaneous time records, and tend to overestimate the amount of time spent on a particular task. See MacEwen and Stanton, "Billable Hours", Adam Smith Esq. (2012).

Regardless of why it happens, the fact remains that block billing is big business for law firms—and a massive expense for those clients who are block-billed. According to the California State Bar, block billing causes lawyers to inflate the total hours billed to the client by 10-30 percent. See California State Bar Committee on Mandatory Fee Arbitration, Detecting Attorney Bill Padding, Arbitration Advisory 2003-01 (Jan. 29, 2003); see also Darling Int'l, Inc. v. Baywood Partners, Inc., 2007 WL 4532233 at *9 (N.D. Cal. 2007) (as a percentage penalty for block billing, most courts make a reduction ranging from 5% to 30%, consistent with the California State Bar committee's findings). In fact, many courts believe that block billing inflation is actually much worse, and will slash lawyers' block-billed time by more than half. See, e.g., Ceglia v. Zuckerberg & Facebook (W.D.N.Y. 2012) Case No. No. 10-CV-00569A(F); Kirsch v. Fleet Street, Ltd., 148 F.3d 149, 173 (2d Cir. 1998).

Simply adding the smallest unit of billable time (0.1 hour) onto a lawyer's daily timesheet results in an extra $10,000-25,000 in unearned fees in a single year, depending upon the lawyer's billing rate. Now consider that, according to the California State Bar and nearly every state and federal court in the country, most lawyers' daily time submissions contain anywhere from thirty minutes to three hours of time billed to clients that was not actually worked. For the average senior lawyer, that translates to more than a quarter million dollars per year in fees for work that never happened.

By design, block billing makes it nearly impossible for clients to determine whether they are being fairly billed, which prompted the United States Court of Appeals to express "a concern about the use of block billing . . . " since "billing practices that camouflage the work a lawyer does naturally and quite correctly raise suspicions about whether all of the work claimed was actually accomplished or whether it was necessary." Robinson v. City of Edmund, 160 F.3d 1275 (10th Cir. 1998).

Another court observed that block billing allows lawyers to "claim compensation for rather minor tasks which, if reported individually, would not be compensable" and precludes the client "from determining whether individual tasks were expeditiously performed within a reasonable period of time because it is impossible to separate into components the services which have been lumped together." In re Leonard Jed Company, 103 B.R. 706 (Bankr. D. Md. 1989).

There is a long felt need to automatically manage legal costs by minimizing block billing of legal fees through the automatic detection of block billing. The present invention overcomes this shortcoming of the existing art.

BRIEF SUMMARY OF THE INVENTION

One aspect of the present invention includes the detection of block billing in an electronic legal bill using a special purpose computing apparatus. The computing apparatus includes a network interface electrically connected to a cloud network to receive network packets containing the electronic legal bill. The apparatus also includes a memory electrically connected to the network interface to store the electronic legal bill. It also includes one or more processing cores electrically connected to the memory and the network interface. The processing cores separate the electronic legal bill into specific billing entries, parses the specific billing entries into a data structure of tokens, searches the data structure of tokens for a list (which is an indicia of block billing), and sends a notification through the network interface to the cloud network.

In one embodiment of the inventions, the processing cores could remove each billing entry with the indicia of block billing from the electronic legal bill and sends the electronic legal bill to the cloud network. The indicia of block billing could be a grammatical analysis, a textual analysis and/or a graphical analysis. The grammatical analysis could include a comparison of a count of "and" tokens to a predetermined number or a comparison of a count of verb tokens to a predetermined number. The textual analysis could include a comparison of a count of punctuation type tokens to a predetermined number, where the punctuation type tokens could include a dash. The graphical analysis could include a comparison of an image of the specific billing entry to a predetermined image.

Another aspect of the present invention includes a method for detecting block billing in an electronic legal bill, the method including the steps of receiving the electronic legal bill from a law firm computer, separating each line in the electronic legal bill into a specific billing entry, parsing each specific billing entry of the electronic legal bill into a data structure of tokens, analyzing the data structure of tokens to identify a list, said list which is an indicia of block billing, and sending a notification back to the law firm computer if the analysis indicates block billing.

One embodiment of the method includes the additional steps of removing each billing entry with the indicia of block billing from the electronic legal bill and sending the electronic legal bill to an insurance company computer. The analysis could include a grammatical analysis, and the grammatical analysis could include a comparison of a count of "and" tokens or verb tokens to a predetermined number. The analysis could be a textual analysis, and the textual analysis could include a comparison of a count of punctuation type tokens to a predetermined number. The punctuation type tokens could include a dash. The analysis could also include a graphical analysis where the graphical analysis includes a comparison of an image of the specific billing entry to a predetermined image.

DETAILED DESCRIPTION

High volume legal billing, such as in the legal billing for insurance companies where there are numerous ongoing litigations, is typically performed electronically between the computers of the law offices 101 and the insurance company computers 104 in the office of the general counsel. Legal bill analysis software is placed between these two computers 101, 104 to review and analyze the bills, rejecting the bills, either entirely or in part, that are not in compliance with billing regulations.

Figure 1:
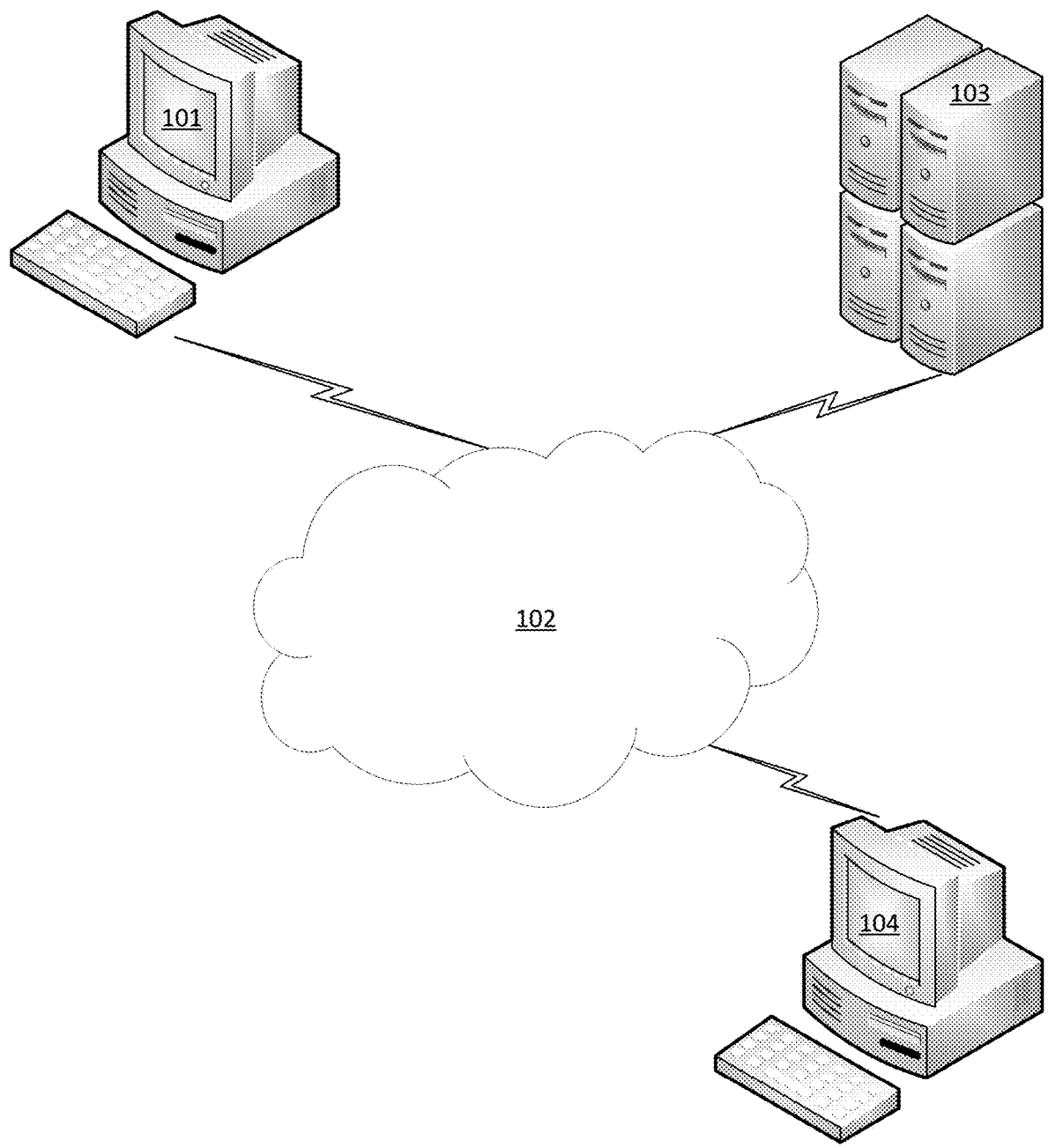
FIG. 1 illustrates the network configuration of the legal billing computing and software packages.

FIG. 1 shows the relationship between the hardware and software of each of these computers. The law firm uses computers 101 at each attorney's desk where the attorney enters his time. Traditionally, each $\frac{1}{10}^{th}$ of an hour is assigned to a client along with a textual description of the task that was performed. In some law offices, a clerk or an attorney reviews each time entry and generates a legal bill to the client on a periodic basis.

Once the software on the law firm computers 101 generates the legal bill, it is sent over a network into the cloud 102. A cloud server 103 receives the legal bill, stores the bill, and runs an analysis on the bill 200. The analysis 200 involves certain heuristics to assure that the legal bill conforms to acceptable standards. If the legal bill does not comply with the standards, the bill is either rejected in its entirety or specific elements of the bill are rejected. For instance, if the approved purchase order for the law firm is $10,000, and the legal bill is for $20,000, the heuristics running on the cloud server 103 will reject the entire bill, and electronically send the bill back to the law firm computer 101.

In another case, the violation of the acceptable standards is related to a specific line in the bill. In this case, the specific line is rejected, but the rest of the legal bill is approved. The cloud server 103 will then send the specific rejected section of the legal bill back to the law firm computer 101. For instance, if billing for copying papers is not allowed, and a line for copying is included on the bill, that line is rejected, and the rest of the bill is approved. Or in another example, a description of the work performed may be missing, so that line in the bill is rejected.

The law firm may accept the rejection or correct the bill. For instance, in the case of the missing description, the law firm may supply the missing information and resubmit that portion of the legal bill through the law firm computer 101.

Once the cloud server 103 has completed the analysis of the legal bill, a copy of the approved legal bill is sent over the cloud 102 to the insurance company computer 104 for payment. In some embodiments, the rejected bills and lines are sent to the insurance company computer 104 to track the effectiveness of the heuristics.

The cloud server 103 is a special purpose, RAM and core heavy computing device designed to efficiently interface to the cloud 102 and to store large quantities of data. The cloud server 103 incorporates significant RAM and processing cores to allow for timely analysis of a large quantity of legal bills. The cloud 102 is a collection of computers and networks that appear as one entity. The network could be the Internet and/or other wide area networks. Other networking structures could also be used without detracting from these inventions. The law firm computer 101 and the insurance company computer 104 could be any computing device such as a tablet, mobile phone, smart watch, laptop, personal computer, or larger computing device. The law firm computer 101, in one embodiment, converts the legal bill into one or more TCP/IP packets containing the billing information that is sent through the cloud 102 to the cloud server 103. The billing information could be in a PDF file, an image, an XML file, or form data from a web page. In some embodiments, the cloud server 103 and the insurance company computer 104 could be the same device. In another embodiment, the cloud server 103 and the law firm computer 101 could be the same device.

Figure 2:
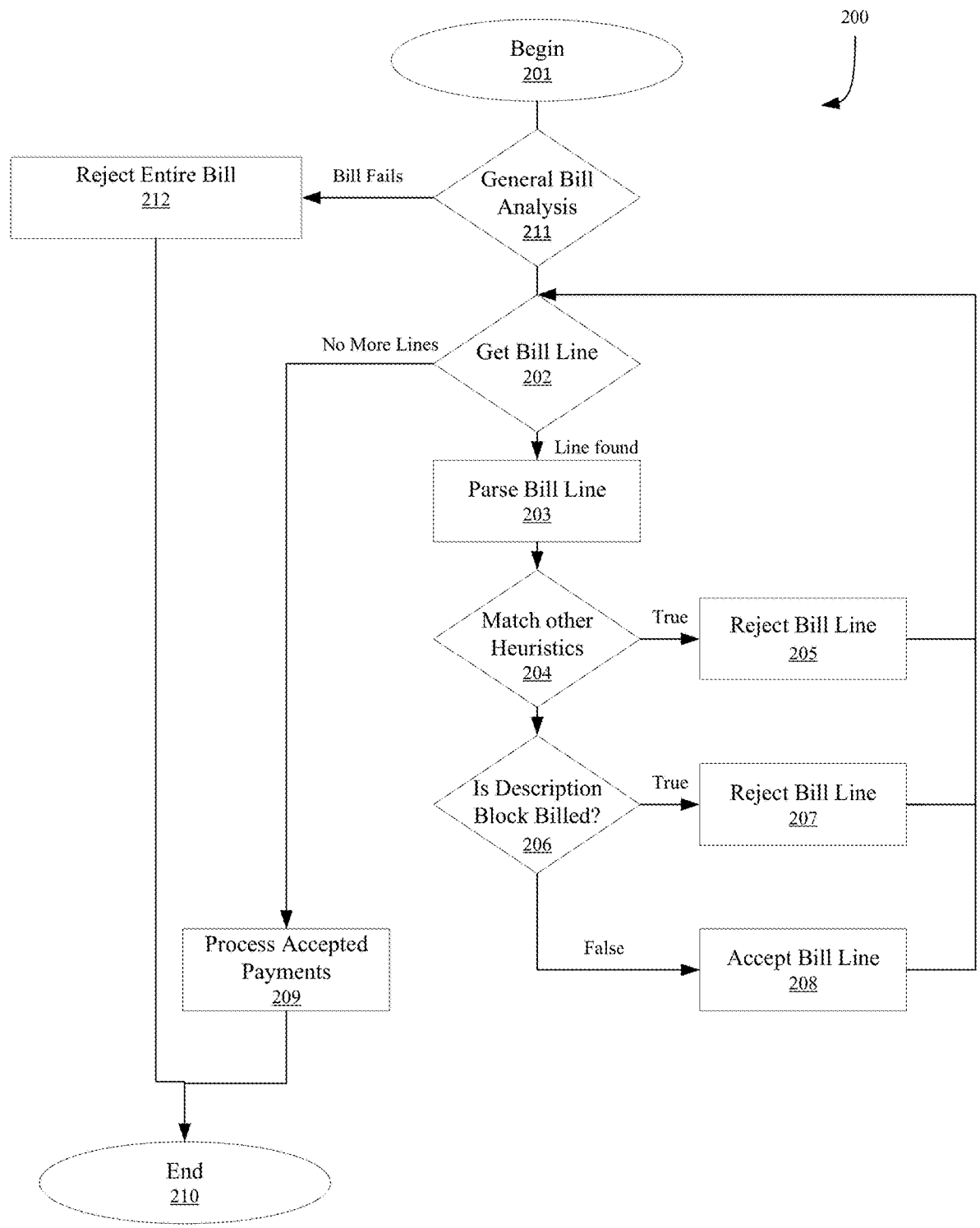
FIG. 2 shows a flow chart of the automatic legal bill review.

FIG. 2 shows the process 200 that the cloud server 103 could perform as it analyzes the legal bill. While this algorithm is typically executed on the cloud server 103, the algorithms described herein could be executed on the law firm computer 101, the insurance company computer 104, or another device without taking away from the invention.

The legal bill review 200 is executed for each legal bill that arrives for review, beginning at 201. Each bill is analyzed by general heuristics 211 to assure that the overall legal bill conforms to the standards. Next, each line of the legal bill is analyzed for compliance with the line-by-line heuristics 204, 206.

If the bill fails the general heuristics 211, the legal bill is rejected 212, and the process ends 210. The rejection 212 includes sending the legal bill back to the law firm computer 101 along with an explanation of why the bill is rejected, perhaps simply with a reference to the specific heuristic that caused the failure. The legal bill is not sent for payment, and a record of the failure is maintained for future analysis of the effectiveness of the heuristics.

If the bill passes the general heuristics 211, then the algorithm gets (reads) the first line of the legal bill 202. The line is parsed into its components 203, extracting the date of service, the law firm employee who performed the task, a description of the task, the number of hours worked, the billing rate, and the overall cost of the task. The parsing could be simply column based, looking at specific locations on the screen for the data, or could employ more complex parsing algorithms as looking for delimiters and tokenizing the line.

Next, the other heuristics 204 are run on the data to see if this line of the bill is acceptable. If the other heuristics 204 match a pattern in the bill, then the line of the bill is rejected 205. The rejection 205 deletes the line from the bill, and notifies the law firm computer of the deletion, along with the reason for the deletion. The process then returns to get the next line of the bill 202. The other heuristics 204 could be looking for missing dates, rates, employee designations, or times. A missing task description could also be the reason to reject the line, as could math errors multiplying the rate by the hours. The rate for the specific employee may be checked against a table of employee rates. The date could be checked against a date range (to eliminate billing of old tasks). Task descriptions could be compared to an employee's skill set, to eliminate lawyers billing at the highest rates for typing and filing.

If the billing line does not match one of the other heuristics 204, then the task description of the legal bill line is checked to see if this line is block billed 206. Block billing is an accounting technique whereby lawyers aggregate multiple smaller tasks into a single "block" entry, for which a single time value is assigned. The method for identifying Block Billing is described in FIG. 3 and below.

If block billing is detected 206 then the billing line is rejected 207 and the law firm computer 101 is notified that the specific billing entry was rejected. The process then returns to get the next line of the bill 202.

If no block billing is detected 206, then the line in the legal bill is accepted 208 and stored for payment processing. The process then returns to get the next line of the bill 202.

If the next line of the bill 202 is not found, then the entire bill has been analyzed. The remaining lines of the legal bill are combined into an acceptable legal bill 209. The amount due for each line is summed, and the accepted bill is sent for payment. The legal bill review 200 is finished 210.

Figure 3:
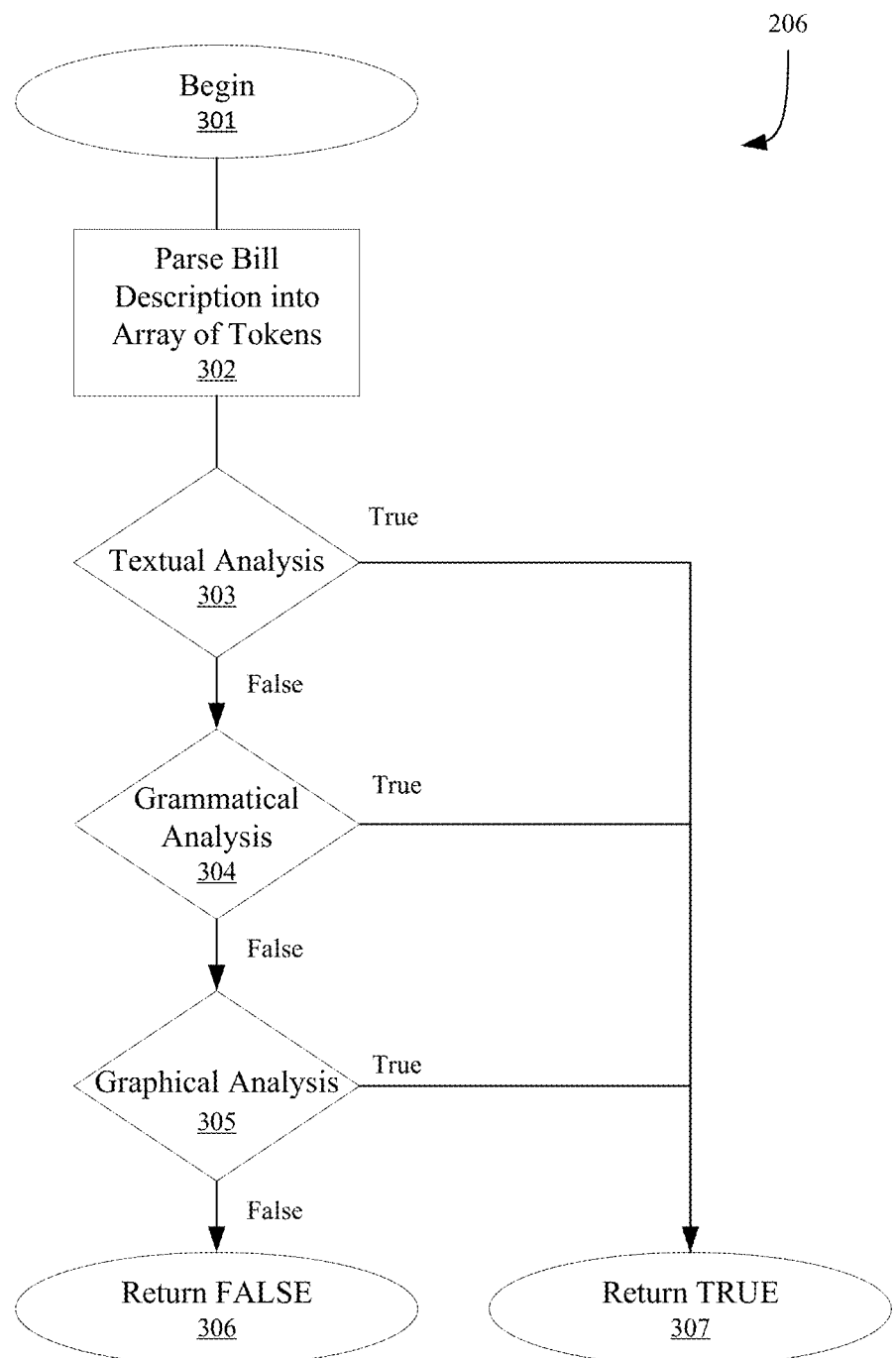
FIG. 3 shows the block billing detection flow chart.

FIG. 3 shows the block billing detection process 206. This process parses the bill 302, performs a textual analysis 303, a grammatical analysis 304, and finally a graphical analysis 305 on the task description in the bill. In one embodiment, the block billing process 206 is a software function, and returns TRUE or FALSE, depending upon whether block billing is detected.

Essentially, the detection of block billing is by using novel natural language techniques to identify a list. As such, the techniques disclosed herein could be considered a subset of natural language processing.

The block billing process 200 begins 301 with the parsing of the task description into an array of tokens 302. This is performed by seeking delimiters and tokenizing the line. This could also be performed in the parsing of the bill line 203. In either case, the task description is placed in an array or linked list of tokens. Care is taken in the parsing to preserve the delimiters, as these may be important in the textual analysis 303 below.

Once the task description has been tokenized 302, a textual analysis is performed on the list of tokens. The textual analysis 303 is explained below and in FIG. 4. If the textual analysis 303 identifies block billing, then the block billing function 200 returns TRUE to the calling function 307.

If the textual analysis 303 does not find block billing, then a grammatical analysis 304 is performed on the list of tokens. The grammatical analysis 304 is explained below and in FIG. 6. If the grammatical analysis 304 identifies block billing, then the block billing function 200 returns TRUE to the calling function 307.

If the grammatical analysis 304 does not find block billing, then a graphical analysis 305 is performed on the list of tokens. The graphical analysis 305 is explained below and in FIG. 5. If the graphical analysis 305 identifies block billing, then the block billing function returns TRUE to the calling function 307. If not, the block billing function 206 returns FALSE 306.

Figure 4:
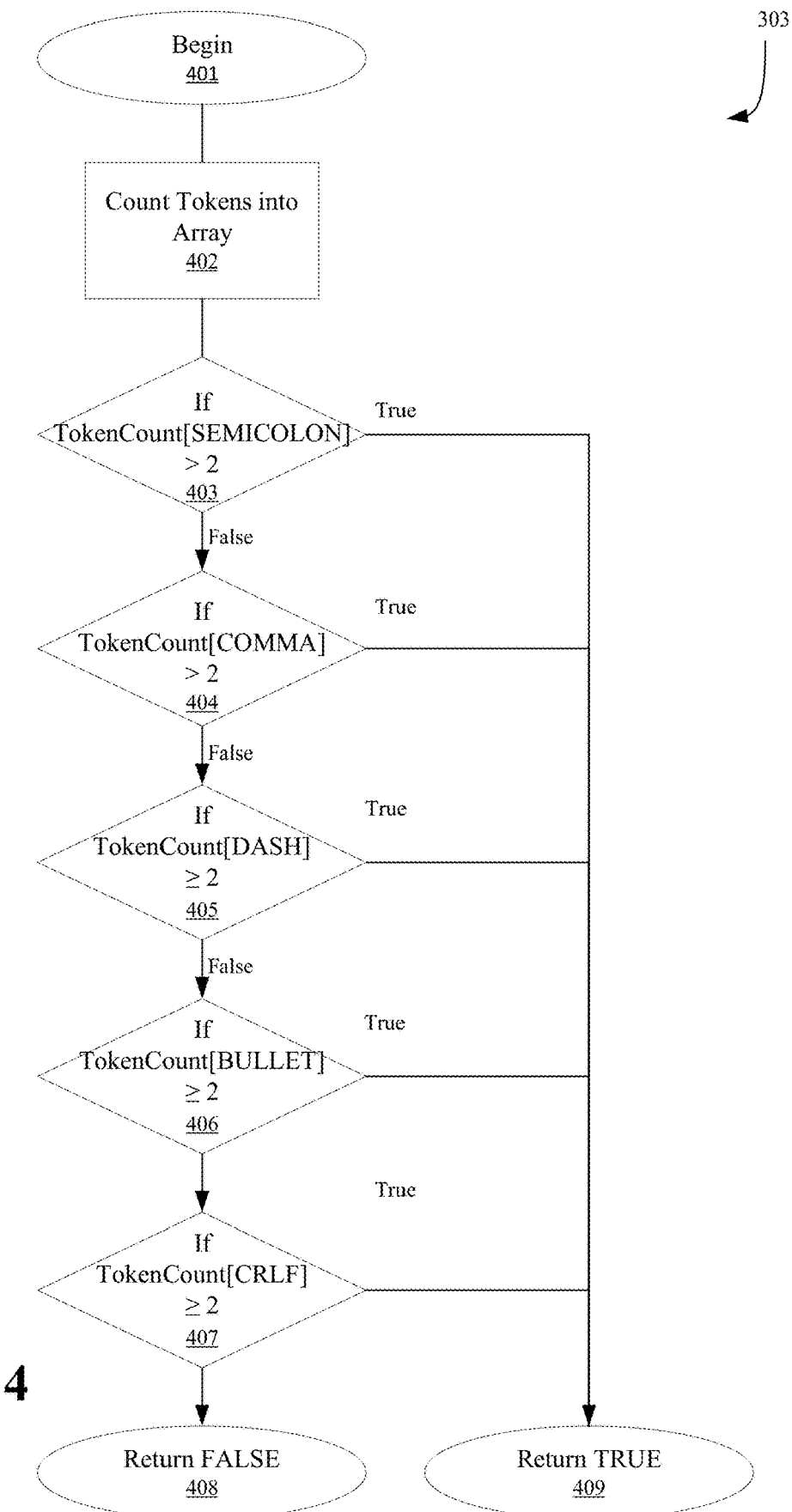
FIG. 4 illustrates the textual analysis routine in a flow chart.

The textual analysis 303 function is seen in FIG. 4. This function begins 401 with the counting of the tokens 402. While there are many alternative techniques, one possibility is to use the token identifier as the index into a sparse array of counts. For instance, if a COMMA is defined as 44 (its ASCII representation), then each time a COMMA is found in the list of tokens, array TokenCount[44] is incremented by one. The code is simple. For (x=0; x<TokenCount; x++) TokenCount[Token[x]]++.

Next, we check the TokenCount array for various forms of punctuation that are commonly used in lists. For instance, if more than two SEMICOLONs are found 403 or more than two COMMAs 404, then block billing is likely, and the textual analysis function 303 returns TRUE 409. Other checks are for two or more DASHes 405, two or more BULLETs 406, two or more Carriage Return/Line Feeds 407 (this could be detected separately or combined). Another embodiment could include a search for PERIODs to find multiple sentences in the text description. The coding for each of these could be as simple as If (TokenCount[DASH] >=2), return TRUE. In another embodiment, a fixed array of the count limits for various punctuation may be used in a loop to compare to the TokenCount array. For (x=0; x<SymbolCount; x++) if (TokenCount[x]>=TokenLimit[x]) return TRUE; return FALSE.

If no textual element is found to exceed the limits, then the textual analysis function 303 returns FALSE, indicating that the heuristics did not detect block billing.

In some embodiments, the textual analysis 303 also checks multiple character patterns (this could be arranged by the parser or in the code in this function), such as searching for "1)" or "1." or "II" for different types of numbered lists.

Figure 5:
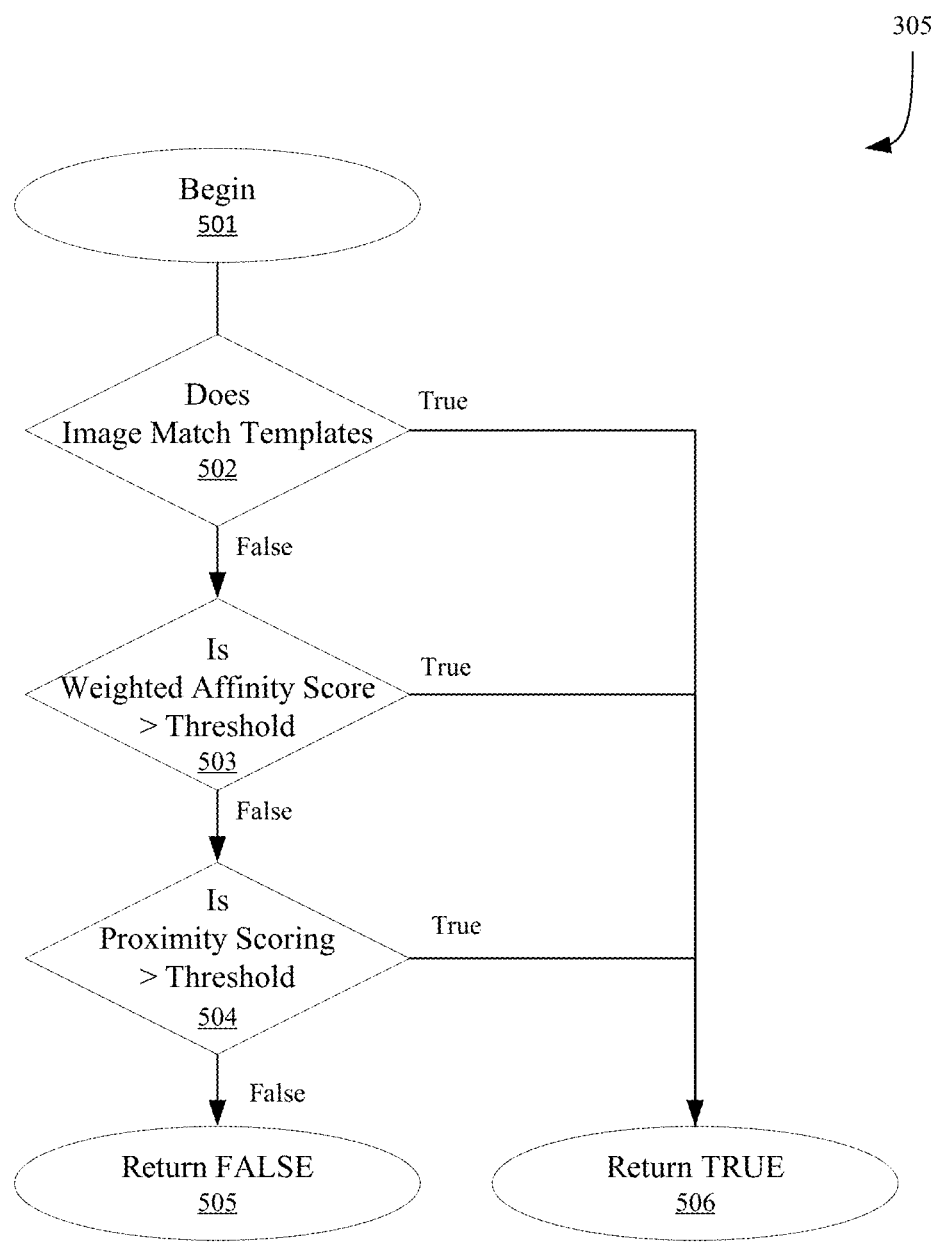
FIG. 5 is a flow chart of the graphical analysis routine.

The graphical analysis 305 showing in FIG. 5 looks at the task description from a visual viewpoint. Rather than taking the token list of the other analysis functions 303, 304, the graphical analysis 305 function, beginning at 501, could take the bitmap of the task description, and then compare the image to various images of lists 502. In one embodiment, the image resolution is reduced by various downscaling algorithms so that a high level, quick comparison can be performed. If the comparison finds a match, then the graphical analysis function returns TRUE 506.

If the bitmap comparison 502 does not find a match, then comparisons using a weighted affinity score 503 and a proximity scoring algorithm 504 could be performed. If either of these match, the graphical analysis function 305 returns TRUE 506. Otherwise the graphical analysis function 305 returns FALSE 505.

Figure 6:
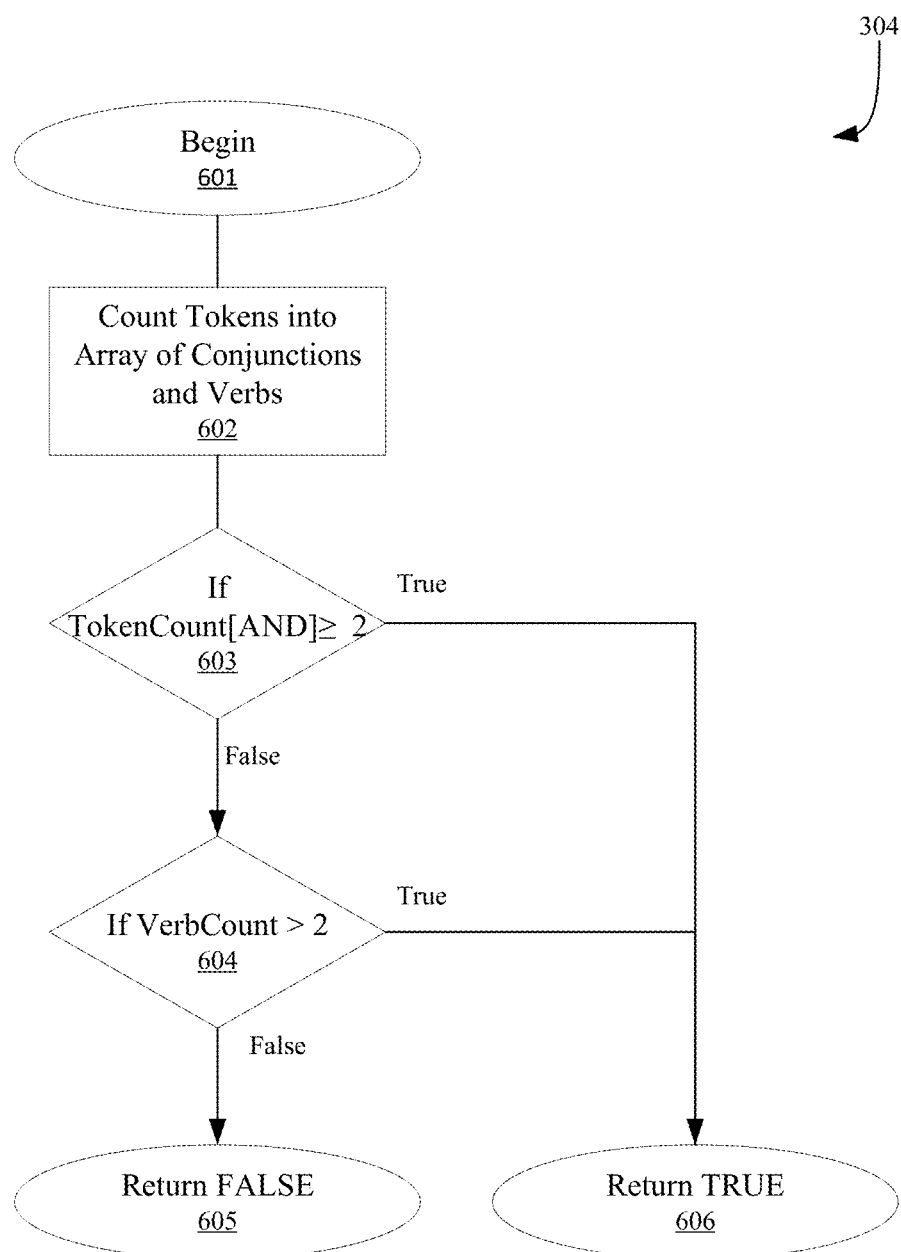
FIG. 6 shows the flow chart of the grammatical analysis routine.

FIG. 6 shows the grammatical analysis function 304. This function begins 601 with the parsing of the task description into an array of conjunctions and verbs 602. This parsing could be combined with the overall bill parsing 202 and/or the parsing for the textual analysis 302, although the parsing in 602 is looking for different information. The parser 602 breaks apart the task description into an array or linked list of words that are tagged by grammatical type (noun, verb, conjunction, etc.). Natural language processing techniques, such as part-of-speech tagging, are used in some embodiments to identify the grammatical type.

Once the task description is parsed 602, the array is searched for the word "and" 603. If two or more "ands" are found in the task description, the grammatical analysis 304 function returns TRUE 606.

Otherwise, the number of verbs is analyzed 604 to see if there are more than two verbs. An excess of verbs indicates that the task description contains block billing, and the grammatical analysis 304 function returns TRUE 606. Otherwise, the grammatical analysis 304 function returns FALSE 605.

With the above techniques, the heuristics for analyzing legal bills can be enhanced with the detection of block billing.

The foregoing devices and operations, including their implementation, will be familiar to, and understood by, those having ordinary skill in the art. While the examples above are for English language analysis, one of skill in the art could transform this analysis to other Latin based languages or to multi-byte languages (Asian languages). Each of the predetermined counts specified above could be increased or decreased without detracting from the inventions herein. In addition, the predetermined counts could be replaced with predetermined percentages.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A special purpose computing apparatus for detection of block billing in an electronic legal bill, the apparatus comprising:
   a network interface electrically connected to a cloud network to receive network packets containing the electronic legal bill;
   a memory electrically connected to the network interface to store the electronic legal bill; and
   one or more processing cores electrically connected to the memory and the network interface where the one or more processing cores are programmed to separate the electronic legal bill into specific billing entries, parse the specific billing entries into a data structure of tokens, search the data structure of the tokens using a grammatical analysis to identify a list in the specific billing entry, wherein the grammatical analysis is programmed to evaluate a grammatical type of the tokens and when the evaluation determines that the grammatical analysis does not identify the list, the one or more processing cores are programmed to then separate the electronic legal bill into one or more bitmap images of each specific billing entries, compare the one or more bitmap images of each of the specific billing entries to various images of lists using a graphical analysis for the list, set a notification to true if the graphical analysis identifies the list; and
   send the notification through the network interface to the cloud network.

2. The apparatus of claim 1 wherein the grammatical analysis comprises a comparison of a count of "and" tokens to a predetermined number.

3. The apparatus of claim 1 wherein the grammatical analysis comprises a comparison of a count of verb tokens to a predetermined number.

4. A special purpose computing apparatus for detection of block billing in an electronic legal bill, the apparatus comprising:
   a network interface electrically connected to a cloud network to receive network packets containing the electronic legal bill;
   a memory electrically connected to the network interface to store the electronic legal bill; and
   one or more processing cores electrically connected to the memory and the network interface where the one or more processing cores are programmed to separate the electronic legal bill into specific billing entries, parse the specific billing entries into a data structure of tokens, search the data structure of the tokens using a textual analysis is programmed to identify a list in the specific billing entry, wherein the textual analysis evaluate characters found in the data structure of the tokens and when the evaluation determines that the textual analysis textual analysis does not identify the list, the one or more processing cores are programmed to then separate the electronic legal bill into one or more bitmap images of each specific billing entries, compare the one or more bitmap images of each of the specific billing entries to various images of lists using a graphical analysis for the list, set a notification to true if the graphical analysis identifies the list; and
   send the notification through the network interface to the cloud network.

5. The apparatus of claim 4 wherein the textual analysis comprises a comparison of a count of punctuation type tokens to a predetermined number.

6. The apparatus of claim 5 wherein the punctuation type tokens include a dash.

7. A special purpose computing apparatus for detection of block billing in an electronic legal bill, the apparatus comprising:
   a network interface electrically connected to a cloud network to receive network packets containing the electronic legal bill;
   a memory electrically connected to the network interface to store the electronic legal bill; and
   one or more processing cores electrically connected to the memory and the network interface where the one or more processing cores are programmed to separate the electronic legal bill into specific billing entries, parse the specific billing entries into a data structure of tokens, search the data structure of the tokens using a textual analysis to identify a list in the specific billing entry, wherein the textual analysis is programmed to evaluate characters found in the data structure of the tokens and when the evaluation determines that the textual analysis does not identify the list, search the data structure of the tokens using a grammatical analysis to identify the list in the specific billing entry, wherein the grammatical analysis is programmed to evaluate a grammatical type of the tokens and when the evaluation determines that the grammatical analysis and the textual analysis does not identify the list, then the one or more processing cores are programmed to separate the electronic legal bill into one or more bitmap images of each specific billing entries, compare the one or more bitmap images of each of the specific billing entries to various images of lists using a graphical analysis for a list, and set a notification to true if the graphical analysis identifies the list; and send the notification through the network interface to the cloud network.

8. The apparatus of claim 7 where the graphical analysis comprises a comparison of an image of the specific billing entry to a predetermined image.

9. The apparatus of claim 1 where the graphical analysis comprises a comparison of an image of the specific billing entry to a predetermined image.

10. The apparatus of claim 4 where the graphical analysis comprises a comparison of an image of the specific billing entry to a predetermined image.

11. The apparatus of claim 7 wherein the grammatical analysis comprises a comparison of a count of "and" tokens to a predetermined number.

12. The apparatus of claim 7 wherein the grammatical analysis comprises a comparison of a count of verb tokens to a predetermined number.

13. The apparatus of claim 7 wherein the textual analysis comprises a comparison of a count of punctuation type tokens to a predetermined number.

14. The apparatus of claim 13 wherein the punctuation type tokens include a dash.

* * * * *